(No Model.)

J. C. FINNELL.
LAP LINK FOR SINGLETREES OR DOUBLETREES.

No. 578,226.  Patented Mar. 2, 1897.

Witnesses

Inventor,
John C. Finnell.
By
Attorney

THE NORRIS PETERS CO., PHOTO-LITHO., WASHINGTON, D. C.

UNITED STATES PATENT OFFICE.

JOHN CALVIN FINNELL, OF MONTICELLO, ARKANSAS.

LAP-LINK FOR SINGLETREES OR DOUBLETREES.

SPECIFICATION forming part of Letters Patent No. 578,226, dated March 2, 1897.

Application filed June 10, 1896. Serial No. 595,046. (No model.)

*To all whom it may concern:*

Be it known that I, JOHN CALVIN FINNELL, a citizen of the United States, residing at Monticello, in the county of Drew and State of Arkansas, have invented certain new and useful Improvements in Lap-Links for Singletrees or Doubletrees; and I do declare the following to be a full, clear, and exact description of the invention, such as will enable others skilled in the art to which it appertains to make and use the same.

My invention has relation to improvements in lap-links for connecting single and double trees to the cross-bar of the thills or pole; and the object is to provide an adjustable device of this kind that can be readily applied, without the use of any special tools, to replace a worn or broken one; and to this end the novelty consists in the construction, combination, and arrangement of the same, as will be hereinafter more fully described, and particularly pointed out in the claim.

In the accompanying drawings the same letters of reference indicate like parts of the invention.

Figure 1:
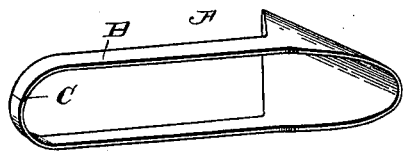
Figure 2:
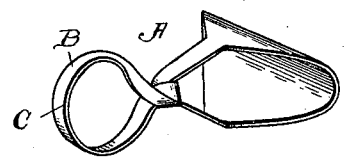
Figure 3:
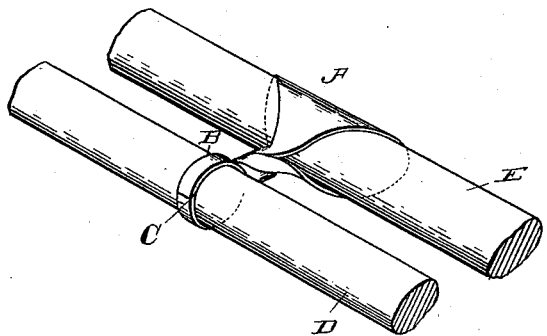
Figure 4:
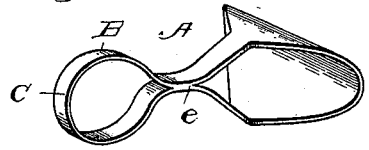

Figures 1 and 2 are perspective views of my improved link. Fig. 3 shows the same applied to a singletree and cross-bar, and Fig. 4 is a modification of the same.

A is the link proper, consisting of the strap B, having its ends welded together at C. The welded end is then placed over the cross-bar D at the proper point, the single or double tree E placed in the strap end, and, using the singletree as a double lever, the link is twisted or "frizzed" between the cross-bar and the tree until the said link is firmly secured by friction to both as firmly as if it were riveted or bolted thereto.

It will be observed that the link A is formed with a broad band which forms a sleeve or socket, thereby enabling the link to firmly grip or encompass the tree E, and thus support the cross-bar D.

In the modification I first weld the link at the point e, then the end at C. The cross-bar and the tree are then inserted in their respective openings and secured by "frizzing," as before.

Having thus described my invention, what I claim, and desire to secure by Letters Patent of the United States, is—

As an improved article of manufacture, a lap-link having a broad bearing-flange at its larger end, the whole being formed with single and double tree eyes, formed by twisting the body of the link upon itself between said eyes, substantially as shown and described.

In testimony whereof I hereunto affix my signature in presence of two witnesses.

JOHN CALVIN FINNELL.

Witnesses:
   Z. T. WOOD,
   T. E. HAMMOCK.